United States Patent
Cortes Fibla

(10) Patent No.: US 12,240,939 B2
(45) Date of Patent: Mar. 4, 2025

(54) LEADING EDGE PROTECTION COMPOSITION AND USES THEREOF

(71) Applicant: AEROX ADVANCED POLYMERS, SL, La Pobla de Vallbona (ES)

(72) Inventor: Enrique Cortes Fibla, La Pobla de Vallbona (ES)

(73) Assignee: AEROX ADVANCED POLYMERS, SL, La Pobla de Vallbona (ES)

( * ) Notice: Subject to any disclaimer, the term of this patent is extended or adjusted under 35 U.S.C. 154(b) by 165 days.

(21) Appl. No.: 17/289,176

(22) PCT Filed: Oct. 30, 2019

(86) PCT No.: PCT/EP2019/079670
§ 371 (c)(1),
(2) Date: Apr. 27, 2021

(87) PCT Pub. No.: WO2020/089296
PCT Pub. Date: May 7, 2020

(65) Prior Publication Data
US 2021/0395435 A1    Dec. 23, 2021

(30) Foreign Application Priority Data
Oct. 30, 2018  (EP) ................................ 18382762

(51) Int. Cl.
| C09D 175/06 | (2006.01) |
| C08G 18/44 | (2006.01) |
| C08G 18/73 | (2006.01) |
| F03D 1/06 | (2006.01) |

(52) U.S. Cl.
CPC ............. *C08G 18/44* (2013.01); *C08G 18/73* (2013.01); *C09D 175/06* (2013.01); *F03D 1/0675* (2013.01); *C08G 2150/00* (2013.01); *F05B 2280/4003* (2013.01)

(58) Field of Classification Search
CPC . C08G 18/44; F03D 1/067; F05B 2280/4003; C09D 175/06; C09D 175/00; C09D 175/08; C09D 175/10
See application file for complete search history.

(56) References Cited

U.S. PATENT DOCUMENTS

| 2017/0152398 A1* | 6/2017 | Hohnholz | ............ C09D 175/04 |
| 2017/0247567 A1* | 8/2017 | Høiås | ................... C08G 18/792 |
| 2017/0313830 A1* | 11/2017 | Seeger | ................... C08G 18/73 |

FOREIGN PATENT DOCUMENTS

| EP | 2927482 A1 | 10/2015 |
| EP | 2944565 A1 | 11/2015 |
| JP | 2008075048 A * | 4/2008 ........... C09D 175/04 |
| WO | 2010/122157 A1 | 10/2010 |
| WO | 2016/042143 A1 | 3/2016 |

OTHER PUBLICATIONS

JP-2008075048-A_Apr. 2008_English Translation.*
International Search Report and Written Opinion for PCT/EP2019/079670, mailed Jan. 27, 2020.
International Preliminary Report on Patentability for PCT/EP2019/079670, mailed Feb. 15, 2021.

* cited by examiner

*Primary Examiner* — Michael L Leonard
(74) *Attorney, Agent, or Firm* — LADAS & PARRY LLP

(57) ABSTRACT

A polyurethane elastomer composition includes a polycarbonate diol and an aliphatic isocyanate, and lacking any solvent. The composition is used for leading edge protection (LEP), preferably of wind turbine rotor blades.

5 Claims, 4 Drawing Sheets though not limiting examples of the aliphatic isocyanate of the present invention are hexamethylene diisocyanate biuret, hexamethylene diisocyanate trimer, HDI allophanate based on hexanediol, IPDI trimer, polyurethane prepolymer from IPDI and polyester, polyurethane prepolymer from IPDI and polyether, mixed trimer of HDI and IPDI, mixed trimer of HDI and TDI, polyurethane prepolymer from HDI and polyester or polyurethane prepolymer from HDI and polyether.

LEADING EDGE PROTECTION COMPOSITION AND USES THEREOF

This application is a National Stage of PCT/EP2019/079670, filed Oct. 30, 2019, which claims priority to European Patent Application No. 18382762.5, filed Oct. 30, 2018, which applications are incorporated herein by reference. To the extent appropriate, a claim of priority is made to the above-disclosed applications.

FIELD OF INVENTION

The present invention relates to a polyurethane elastomer composition and to its use for leading edge protection (LEP), preferably of wind turbine rotor blades.

BACKGROUND OF THE INVENTION

The wind turbine rotor blades are exposed to external agents such as weather changes and erosion. For many years, it has been common practice in the wind turbine industry to protect the leading edge of the blades, which is the longitudinal end of the propeller that first comes in contact with the air when it is in operation and thus being the area that suffers the most during the whole life of the blade, against the raindrops, dust particles, insects, hailstones and the like with several protective layers, as well as with paints especially resistant to this type of aggressions, there is an area that is especially affected, the leading edge.

EP2927482A1 relates to a leading edge protective coating or tape provided on the blade surface to present resistance to environmental erosion. It describes a shield that comprises an inner layer made of a polyurethane material reinforced with aramid fibres, an outer layer made of a UV resistant coating layer and an intermediate primer layer.

EP2944565A1 relates to a shapeable elastomeric polymer sleeve covering that conforms to a surface of a foil for protecting objects from erosion forces caused by sand, sun, water, or wind.

WO2010122157A1 relates to coating compositions of anti-erosive topcoats for wind turbine blades polyurethane-based coating including a polyurethane binder.

WO2016042143A1 relates to a coating composition for wind turbine blades comprising a hydroxyl containing polymer, a polycarbonate and a polyisocyanate.

There is still a need for compositions for LEP which last longer, are easier to apply, that ensure the uniformity of the coating and, also, which allow improved protection in any application condition.

SUMMARY OF THE INVENTION

The present invention relates to a polyurethane elastomer composition as well as to the use of said composition for leading edge protection (LEP), particularly of wind turbine rotor blades.

In a first aspect, the present invention relates to a composition comprising a polyurethane elastomer comprising a polycarbonate diol and an aliphatic isocyanate, wherein the composition lacks any solvent, wherein the composition comprises below 20% by weight of pigments or fillers, preferably below 15% by weight of pigments or fillers in respect of the total weight of the composition, wherein when applied as a single layer with a thickness between 100 and 1,000 microns, said composition shows erosion in a rain erosion test according according to DNVGL-RP-0171 erosion test with 2 mm impacts of raindrops at the rate of 70l/hour at a speed of 147 m/s.

DESCRIPTION OF THE INVENTION

The present invention provides a polyurethane elastomer composition with improved properties. In particular, the polyurethane elastomer composition of the present invention has improved chemical properties which make it more resistant, easier to apply in one single layer and where both of its components (polycarbonate diol and an aliphatic isocyanate) are 100% solid, without solvents. As used herein, the expression "100% solid" refers to the polycarbonate diol and the aliphatic isocyanate which do not contain any water or any organic or inorganic solvents. Because both components are 100% solid, the composition of the invention does not lose any mass upon condensation or polymerization to form the solid polyurethane layer. Thus, the present invention provides an improved composition for LEP, especially for LEP of wind turbine rotor blades for all kind of erosions. Also, the composition of the invention allows its application in a fast and simple way. Importantly, the LEP achieved with the composition of the present invention shows a longer lifetime.

Thus, in a first aspect, the present invention refers to a composition comprising a polyurethane elastomer comprising:
 a first component comprising more than 80% by weight of a polycarbonate diol in respect of the total weight of this first component and below 20% by weight of pigments or fillers in respect of the total weight of this first component, preferably below 15% by weight and
 a second component comprising an aliphatic isocyanate, wherein the composition lacks any solvent.

In a preferred embodiment, the first component comprises between 85 and 98% by weight of a polycarbonate diol and between 15 and 2% of pigments or fillers, more preferably between 88 and 96% by weight of a polycarbonate diol and between 16 and 4% by weight of pigments or fillers in respect of the total weight of this first component.

In a preferred embodiment of the present invention, the composition of the first aspect comprises no pigment. As used herein, the term "pigment" refers to an additive that gives the composition the desired color. As used herein, the term "filler" refers to particles added to materials (plastics, composite material, concrete) to lower the consumption of more expensive binder material or to improve some properties of the mixtured material. In some cases, the term "filler" also refers to an additive that includes pigments and colouring agents. Pigments or fillers such as titanium dioxide as used herein, can also provide improved durability and weathering, corrosion resistance, antifouling or fire retardancy.

As used herein, the term "polycarbonate diol" refers to an aliphatic polycarbonate with two terminal OH groups. In a preferred embodiment of the composition of the first aspect, the polycarbonate diol is selected from 1,5-pentanediol or 1,6-hexanediol or mixtures thereof.

As used herein, the term "aliphatic isocyanate" refers to isocyanates where the cyanate group is not directly attached to an aromatic ring. In a preferred embodiment of the composition of the first aspect, the aliphatic isocyanate comprises at least one HDI-based isocyanate. In a preferred embodiment of the present invention, the aliphatic isocyanate is selected from hexamethylene diisocyanate (HDI) and isophorone diisocyanate (I PDI) based isocyanates. In a preferred embodiment of the present invention, suitable aliphatic isocyanates derivatives are, but not limited to, isocyanurate, biuret, iminooxadiazinedione, allophanate, dimer uredione or mixtures thereof.

In another preferred embodiment of the composition of the first aspect, the polycarbonate diol has a molecular weight of between 1,000 and 3,000 g/mol, preferably between 1,000 and 2,000 g/mol. Also, in a preferred embodiment, the aliphatic isocyanate has a molecular weight of between 500 and 2,000 g/mol.

In another preferred embodiment of the composition of the first aspect, the composition comprises more than 40% by weight of the polycarbonate diol, preferably more than 45% by weight of the polycarbonate diol, more preferably more than 50% by weight of the polycarbonate diol, in respect of the total weight of the composition. In another preferred embodiment, the composition comprises between 20 and 60% by weight, preferably between 25 and 50% by weight, more preferably between 28 and 40% by weight of aliphatic isocyanate in respect of the total weight of the composition. In another preferred embodiment, the weight ratio of polycarbonate diol:aliphatic isocyanate in the composition is between 3:1 and 1:1, preferably 2:1.

In another preferred embodiment of the composition of the first aspect, said composition further comprises one or more catalyst(s), preferably between 0.01 and 0.30% by weight of catalyst(s) in respect of the weight of the first component of the composition. As used herein, the term "catalyst" refers to an additive added to accelerate the condensation reaction. In another preferred embodiment of the composition of the first aspect, said composition further comprises one or more antifoaming agent(s), preferably between 0.30 and 1.20% by weight of antifoaming agent(s) in respect of the first component of the composition. As used herein, the term "antifoaming agent" refers to a chemical additive that reduces and/or hinders the formation of foam. In another preferred embodiment of the composition of the first aspect, said composition further comprises one or more deaerating agent(s), preferably between 0.10 and 0.60% by weight of deaerating agent(s) in respect of the total weight of the first component of composition. As used herein, the term "deaerating agent" refers to a chemical additive that reduces or eliminates air and other dissolved gases. In another preferred embodiment of the composition of the first aspect, said composition further comprises one or more pigment dispersant(s), preferably below 0.50% by weight of pigment dispersant(s) in respect of the total weight of first component of the composition. As used herein, the term "pigment dispersant" refers to an additive that prevents flocculation of solid particles. In another preferred embodiment of the composition of the first aspect, said composition further comprises one or more adherence improving agent (s), preferably between 0.10 and 0.60% by weight of adherence improving agent(s) in respect of the total weight of the composition. As used herein, the term "adherence improving agent" refers to an additive that ameliorates the adhesion of the different components of the composition. In another preferred embodiment of the composition of the first aspect, said composition further comprises one or more thixotropic agent(s), preferably between 0.50 and 4.00% by weight of thixotropic agent(s), in respect of the total weight of the first component of the composition. As used herein, the expression "thixotropic agent" refers to a thickening additive.

The composition of the first aspect exhibits a gel time between 5 to 25 minutes. As used herein, the expression "gel time" refers to the transition of a material from a viscous liquid to an elastic solid.

In another preferred embodiment of the composition of the first aspect, the composition preferably comprises a polyurethane elastomer comprising a polycarbonate diol and an aliphatic isocyanate, wherein the composition lacks any solvent, wherein the composition comprises below 20% by weight of pigments or fillers, preferably below 15% by weight of pigments or fillers in respect of the total weight of the first component of the composition, wherein when applied as a single layer with a thickness between 100 and 1,000 microns, said composition shows erosion in a rain erosion test according to according to DNVGL-RP-0171 erosion test with 2 mm impacts of raindrops at the rate of 70 l/hour at a speed of 147 m/s; said composition comprises no pigment; and the polycarbonate diol is selected from 1,5-pentanediol or 1,6-hexanediol or mixtures thereof.

In another preferred embodiment of the composition of the first aspect, the composition preferably comprises a polyurethane elastomer comprising a polycarbonate diol and an aliphatic isocyanate, wherein the composition lacks any solvent, wherein the composition comprises below 20% by weight of pigments or fillers, preferably below 15% by weight of pigments or fillers in respect of the total weight of the first component of the composition, wherein when applied as a single layer with a thickness between 100 and 1,000 microns, said composition shows erosion in a rain erosion test according to according to DNVGL-RP-0171 erosion test with 2 mm impacts of raindrops at the rate of 70 l/hour at a speed of 147 m/s; said composition comprises no pigment; and the aliphatic isocyanate comprises at least one HDI-based isocyanate.

In another preferred embodiment of the composition of the first aspect, the composition preferably comprises a polyurethane elastomer comprising a polycarbonate dial and an aliphatic isocyanate, wherein the composition lacks any solvent, wherein the composition comprises below 20% by weight of pigments or fillers, preferably below 15% by weight of pigments or fillers in respect of the total weight of the first component of the composition, wherein when applied as a single layer with a thickness between 100 and 1,000 microns, said composition shows erosion in a rain erosion test according to according to DNVGL-RP-0171 erosion test with 2 mm impacts of raindrops at the rate of 70 l/hour at a speed of 147 m/s; said composition comprises no pigment; the polycarbonate diol is selected from 1,5-pentanediol or 1,6-hexanediol or mixtures thereof and has a molecular weight of between 1,000 and 3,000 g/mol, preferably between 1,000 and 2,000 g/mol; and the aliphatic isocyanate has a molecular weight of between 500 and 2,000 g/mol.

In another preferred embodiment of the composition of the first aspect, the composition preferably comprises a polyurethane elastomer comprising a polycarbonate dial and an aliphatic isocyanate, wherein the composition lacks any solvent, wherein the composition comprises below 20% by weight of pigments or fillers, preferably below 15% by weight of pigments or fillers in respect of the total weight of the first component of the composition, wherein when applied as a single layer with a thickness between 100 and 1,000 microns, said composition shows erosion in a rain erosion test according to according to DNVGL-RP-0171 erosion test with 2 mm impacts of raindrops at the rate of 70 l/hour at a speed of 147 m/s; said composition comprises no pigment; the polycarbonate diol is selected from 1,5-pentanediol or 1,6-hexanediol or mixtures thereof and has a molecular weight of between 1,000 and 3,000 g/mol, preferably between 1,000 and 2,000 g/mol; the aliphatic isocyanate has a molecular weight of between 500 and 2,000 g/mol; the composition comprises more than 40% by weight of the polycarbonate diol, preferably more than 45% by weight of the polycarbonate diol, more preferably more than 50% by weight of the polycarbonate diol, in respect of the total weight of the composition; the composition comprises between 20 and 60% by weight, preferably between 25 and 50% by weight, more preferably between 28 and 40% by weight of aliphatic isocyanate in respect of the total weight of the composition; and the weight ratio of polycarbonate diol:aliphatic isocyanate in the composition is between 3:1 and 1:1, preferably 2:1.

In another preferred embodiment of the composition of the first aspect, the composition preferably comprises a polyurethane elastomer comprising a polycarbonate diol and an aliphatic isocyanate, wherein the composition lacks any solvent, wherein the composition comprises below 20% by weight of pigments or fillers, preferably below 15% by weight of pigments or fillers in respect of the total weight of the first component of the composition, wherein when applied as a single layer with a thickness between 100 and 1,000 microns, said composition shows erosion in a rain erosion test according to according to DNVGL-RP-0171 erosion test with 2 mm impacts of raindrops at the rate of 701/hour at a speed of 147 m/s; the composition comprises no pigment; the aliphatic isocyanate comprises at least one HDI-based isocyanate; the polycarbonate diol is selected from 1,5-pentanediol or 1,6-hexanediol or mixtures thereof and has a molecular weight of between 1,000 and 3,000 g/mol, preferably between 1,000 and 2,000 g/mol; the aliphatic isocyanate has a molecular weight of between 500 and 2,000 g/mol; the composition comprises more than 40% by weight of the polycarbonate diol, preferably more than 45% by weight of the polycarbonate dial, more preferably more than 50% by weight of the polycarbonate diol, in respect of the total weight of the composition; the composition comprises between 20 and 60% by weight, preferably between 25 and 50% by weight, more preferably between 28 and 40% by weight of aliphatic isocyanate in respect of the total weight of the composition; and the weight ratio of polycarbonate diol:aliphatic isocyanate in the composition is between 3:1 and 1:1, preferably 2:1.

In another preferred embodiment of the composition of the first aspect, the composition preferably comprises a polyurethane elastomer comprising a polycarbonate diol and an aliphatic isocyanate, wherein the composition lacks any solvent, wherein the composition comprises below 20% by weight of pigments or fillers, preferably below 15% by weight of pigments or fillers in respect of the total weight of the first component of the composition, wherein when applied as a single layer with a thickness between 100 and 1,000 microns, said composition shows erosion in a rain erosion test according to according to DNVGL-RP-0171 erosion test with 2 mm impacts of raindrops at the rate of 701/hour at a speed of 147 m/s; and the composition comprises no pigment; the composition comprises one or more catalyst(s), preferably between 0.01 and 0.30% by weight of catalyst(s), the composition comprises antifoaming agent(s), preferably between 0.30 and 1.20% by weight of antifoaming agent(s), the composition comprises deaerating agent(s), preferably between 0.10 and 0.60% by weight of deaerating agent(s), the composition comprises pigment dispersant(s), preferably below 0.50% by weight of pigment dispersant(s), the composition comprises adherence improving agent(s), preferably between 0.10 and 0.60% by weight of adherence improving agent(s) and/or the composition comprises thixotropic agent(s), preferably between 0.50 and 4.00% by weight of thixotropic agent(s), in respect of the total weight of the first component of the composition.

In another preferred embodiment of the composition of the first aspect, the composition preferably comprises a polyurethane elastomer comprising a polycarbonate diol and an aliphatic isocyanate, wherein the composition lacks any solvent, wherein the composition comprises below 20% by weight of pigments or fillers, preferably below 15% by weight of pigments or fillers in respect of the total weight of the first component of the composition, wherein when applied as a single layer with a thickness between 100 and 1,000 microns, said composition shows erosion in a rain erosion test according to according to DNVGL-RP-0171 erosion test with 2 mm impacts of raindrops at the rate of 701/hour at a speed of 147 m/s; and the composition comprises no pigment; the aliphatic isocyanate comprises at least one HDI-based isocyanate and has a molecular weight of between 500 and 2,000 g/mol; the polycarbonate diol is selected from 1,5-pentanediol or 1,6-hexanediol or mixtures thereof and has a molecular weight of between 1,000 and 3,000 g/mol, preferably between 1,000 and 2,000 g/mol; the composition comprises more than 40% by weight of the polycarbonate diol, preferably more than 45% by weight of the polycarbonate diol, more preferably more than 50% by weight of the polycarbonate diol, in respect of the total weight of the composition; the composition comprises between 20 and 60% by weight, preferably between 25 and 50% by weight, more preferably between 28 and 40% by weight of aliphatic isocyanate in respect of the total weight of the composition; the weight ratio of polycarbonate diol:aliphatic isocyanate in the composition is between 3:1 and 1:1, preferably 2:1; and the composition further comprises one or more catalyst(s), preferably between 0.01 and 0.30% by weight of catalyst(s), the composition comprises antifoaming agent(s), preferably between 0.30 and 1.20% by weight of antifoaming agent(s), the composition comprises deaerating agent(s), preferably between 0.10 and 0.60% by weight of deaerating agent(s), the composition comprises pigment dispersant(s), preferably below 0.50% by weight of pigment dispersant(s), the composition comprises adherence improving agent(s), preferably between 0.10 and 0.60% by weight of adherence improving agent(s) and/or the composition comprises thixotropic agent(s), preferably between 0.50 and 4.00% by weight of thixotropic agent(s), in respect of the total weight of the first component of the composition.

In a second aspect, the present invention relates to a leading edge protection (LEP) comprising the composition of the first aspect, comprising a single layer with a thickness between 100 and 1,000 microns, preferably between 300 and 700 microns, more preferably between 450 and 650 microns. In the present invention, the thickness of the layer of the LEP comprising the composition of the first aspect is measured when the composition is liquid, right after applying it, that is before the condensation between the polyol and the isocyanate has occurred. Said thickness is measured with Neurtek wet film thickness gauge with comb 25-2000 microns (Neurtek, ref0220500).

In a preferred embodiment of the second aspect, the LEP exhibits a peeling of between 12 and 18 N/cm when tested in accordance to UNE-EN-28510-1 at 90°. In another preferred embodiment, the LEP exhibits a pull off of more than 5 MPa in accordance to UNE-ISO-4624. In another preferred embodiment the LEP exhibits a UV ageing below 3 Colour DE when tested in accordance to ASTM D4587-05 for 1000 hours, QUV-B 313 nm and radiation of 0.49±0.02 W/m2 (310 nm). In another preferred embodiment, the LEP exhibits a water uptake of less than 1% by weight in 10 days at a temperature between 18 and 23° C. or less than 2.5% by weight in 1 day at 90° C. In another preferred embodiment, the LEP exhibits a flexibility of between 20 and 100% elongation at 23° C. and between 5 and 20% elongation at −20° C. when tested in accordance to ASTM D522 In another preferred embodiment, the LEP exhibits a roughness of Ra between 1 and 5 (sanded) and a Rz between 10 and 20 (sanded), when tested in accordance to ISO 4287-99 In another preferred embodiment, the LEP exhibits a gloss of more than of 60 GU (non sanded) and less than 5 GU (sanded) with a geometry of 60°, in accordance to ISO 2813:2014. In another preferred embodiment, the LEP exhibits an abrasion of less than 0.05 Wear for 1000 g with an abrasive wheel CS-1000 during 1000 cycles conditions, in accordance to ASTM D4060. In another preferred embodiment, the LEP exhibits a hardness between 30 and 80 Shore A in accordance to ISO 868. In another preferred embodiment, the composition exhibits a traction of E equal to between 2 and 40 MPa, an elongation at break equal to between 50 and 150% and a Tensile Stress break equal to between 0.001 and 40 MPa, in accordance to ISO 527-2.

In another preferred embodiment of the second aspect, the LEP preferably exhibits a peeling of between 12 and 18 N/cm when tested in accordance to UNE-EN-28510-1 at 90°; and a pull off of more than 5 MPa in accordance to UNE-ISO-4624; and a UV ageing below 3 Colour DE when tested in accordance to ASTM D4587-05 for 1000 hours, QUV-B 313 nm and radiation of 0.49±0.02 W/m2 (310 nm); and a water uptake of less than 1% by weight in 10 days at a temperature between 18 and 23° C. or less than 2.5% by weight in 1 day at 90° C.; and a flexibility of between 20 and 100% elongation at 23° C. and between 5 and 20% elongation at −20° C. when tested in accordance to ASTM; and a roughness of Ra between 1 and 5 (sanded) and a Rz between 10 and 20 (sanded), when tested in accordance to ISO 4287; and a gloss of more than of 60 GU (non sanded) and less than 5 GU (sanded) with a geometry of 60°, in accordance to ISO 2813:2014; and an abrasion of less than 0.05 Wear for 1000 g with an abrasive wheel CS-1000 during 1000 cycles conditions, in accordance to ASTM D4060; and a hardness between 30 and 80 Shore A in accordance to ISO 868; and a traction of E equal to between 2 and 40 MPa, an elongation at break equal to between 50 and 150% and a Tensile Stress break equal to between 0.001 and 40 MPa, in accordance to ISO 527-2.

In a third aspect, the present invention relates to a method for preparing the composition of the first aspect or the LEP of the second aspect, comprising the following steps:
a. mixing the polycarbonate diol and the aliphatic isocyanate in a weight ratio between 3:1 and 1:1, preferably 2:1;
b. coating a surface with a single layer of the mix of step (a); and
c. optionally curing the coating of step (b) at a temperature between 15° C. and 50° C. during between 180 and 30 minutes.

As used herein, the term "curing" refers to the toughening or hardening of a polymer material by cross-linking of polymer chains.

Optionally, a primer can be applied prior to the application of the LEP composition. As used herein, the term primer refers to an undercoat or preparatory coating that improves the adhesion of the LEP to the substrate as shown in examples 5 and 6.

In a fourth aspect, the present invention relates to a single layer coating obtained by the process of the third aspect.

In a fifth aspect, the present invention relates to a kit comprising at least two containers, wherein the first container comprises a polycarbonate diol and below 20% by weight of pigments, preferably below 15% by weight of pigments in respect of the total weight of the container content, wherein the second container comprises an aliphatic isocyanate, wherein both containers lack any solvent.

In a preferred embodiment of the kit of the fifth aspect, the density of the content of the first container is between 1.1 and 1.5 g/cm$^3$. In another preferred embodiment, the density of the content of the second container is between 1.1 and 1.5 g/cm$^3$. In a preferred embodiment, the density of the content of the first container and of the second container is between 1.1 and 1.5 g/cm$^3$.

In a sixth aspect, the present invention relates to the use of the composition of the first aspect or the LEP of the second aspect or the single layer of the fourth aspect or the kit of the fifth aspect, for leading edge protection. Preferably, the use is for leading edge protection of wind turbine rotor blades.

EXAMPLES

Figure 1:
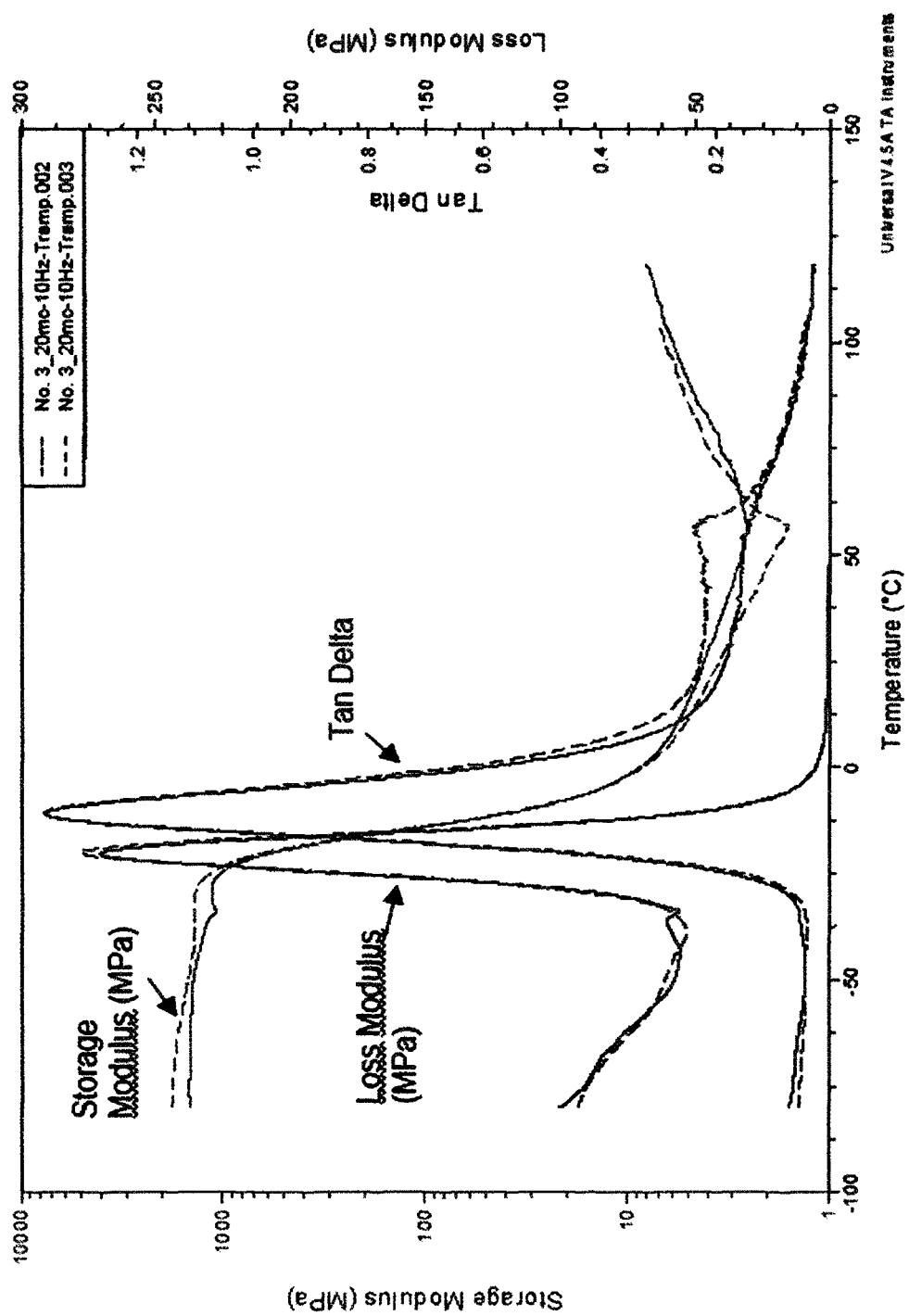
FIG. 1. Dynamic Mechanical Analysis (DMA) for composition No. 3, at a frequency of 10 Hz.

The following examples illustrate the present invention, especially the advantages of the composition of the invention in respect of LEP.

Example 1: Compositions No. 1 to No. 5

Compositions of the invention were obtained by the process previously described. Compositions No. 1 and No. 2 do not include fillers or pigments, composition No. 3 was obtained from a component A comprising 96% wt. of polycarbonate diol in respect to the total weight of component A and compositions No. 4 and No. 5 were obtained from a component A comprising 88% wt. and 66% respectively of polycarbonate diol in respect to the total weight of component A.

TABLE 1

| Compositions No. 1 to No. 5. | | | | | | | |
|---|---|---|---|---|---|---|---|
| Component | | | No. 1 | No. 2 | No. 3 | No. 4 | No. 5 |
| First Component | Polyol | ETERNACOL PH 50 (500 (g/mol) | 100 | | | | |

TABLE 1-continued

Compositions No. 1 to No. 5.

| Component | | No. 1 | No. 2 | No. 3 | No. 4 | No. 5 |
|---|---|---|---|---|---|---|
| | ETERNACOL PH 100 (1000 g/mol) | | 100 | 36 | 28 | 16 |
| | ETERNACOL PH 200 (2000 g/mol) | | | 60 | 60 | 40 |
| ANTIFOAMING AGENT | TEGO AIREX 944 | | | 1 | 1 | 1 |
| DEAERATING AGENT | TEGO WET 250 | | | 0.50 | 0.50 | 0.50 |
| PIGMENT DISPERSANT | DISPERBYK 108 | | | | 0.50 | 0.50 |
| ADHERENCE IMPROVING AGENT | DYNASILAN 1146 | | | 0.50 | 0.50 | 0.50 |
| THIXOTROPIC AGENT | BYK 7410 ET | | | 3 | 3 | 3 |
| CATALYST | FOMREZ SUL 4 | | | 0.02 | 0.02 | 0.02 |
| PIGMENT | PIGMENT TEMACOLOR | | | | 8 | 40 |
| Total First Component | | 100 | 100 | 100 | 100 | 100 |
| Second Component ISOCYANATE | DESMODUR N3300 | 50 | | | | |
| | DESMODUR N3800 | 50 | 100 | 100 | 100 | 100 |
| MIX RATIO (weight) | | 1:1 | | 2:1 | 2:1 | 2:1 |
| SOLID CONTENT | | 100% | 100% | 100% | 100% | 100% |
| VOC (g/l) | | 0 | 0 | 0 | 0 | 0 |
| DENSITY COMPONENT A (g/cm$^3$) | | 1.1-1.2 | 1.1-1.3 | 1.1-1.4 | 1.1-1.5 | 1.1-1.5 |
| DENSITY COMPONENT B (g/cm$^3$) | | 1.1-1.2 | 1.1-1.3 | 1.1-1.4 | 1.1-1.5 | 1.1-1.5 |
| GEL TIME (minutes) | | 5-9 | 5-9 | 5-9 | 5-9 | 5-9 |

Example 2: Curing

Compositions No. 1 to 5 were applied in a single layer layer with a thickness between 100 and 1,000 microns and said coatings were cured at a temperature between 15° C. and 50° C. during between 30 and 180 minutes and at 5% RH.

Example 3: Characterization of Composition No. 4

Composition No. 4 was characterized by several tests.

TABLE 2

Results of the characterization of composition No. 4.

| Test | Standard | Result | Comments |
|---|---|---|---|
| Peeling test | UNE-EN-28510-1 | >16 N/cm | 90° |
| Pull off test | UNE-ISO-4624 | >5 MPa | |
| UV ageing test | ASTM D4587-05 | <3 | 1000 hours, QUV-B 313 nm and radiation of 0.49 ± 0.02 W/m$^2$ (310 nm) |
| Water uptake test | | <1% (18-23° C.) <2.5% (90° C.) | 10 days at a temperature between 18 and 23° C. or less than 2.5% by weight in 1 day at 90° C. |
| Flexibility test | ASTM D522 | 23° C.: e >22%- −20° C.: e >8% | 23° C. and −20° C. |
| Roughness test | ISO 4287-99 | Ra: 1.24 (Sanded) Rz: 13.66 (Sanded) | |
| Gloss test | ISO 2813: 2014 | 62 Non Sanded 1.5 Sanded | Geometry 60° |
| Abrasion test | ASTM D4060 | −0.02 | 1000 g with abrasive wheels CS-1000 during 1000 cycles |
| Hardness test | ISO 868 | 70 | Shore A |

Example 4: Rain Erosion Test

A rain erosion test was carried out according to DNVGL-RP-0171, a standard commonly used in the wind industry. The test in an acceleration from where the erosion of a protection is measured, by means of an accelerated erosion three samples of each composition to test were introduced in a chamber and were subjected to impacts of raindrops at the rate of 70 l/hour at a speed of 147 m/s.

TABLE 3

Results of the rain erosion test under DNVGL-RP-0171.

| COMPOSITION | Minutes |
|---|---|
| No. 1 | 300 |
| No. 2 | 600 |
| No. 3 | 960 |
| No. 4 | 960 |
| No. 5 | 120 |

Example 5: Measure of the Resistance

The resistance of compositions No. 3 and No. 5 was measured by a Dynamic Mechanical Analysis (DMA) according to standard ASTM D5418:2015 including a temperature sweep and oscillatory test mode where the sample undergoes a bending oscillating strain during a temperature ramp is applied. The conditions were as follows:

Temperature sweep from −80° C. to 100° C. at 3° C./min.

Frequency: 10 Hz and 100 Hz.

Strain amplitude: 20 microns, selected within the linear viscosity region (LVR) determined in previous tests with similar materials.

Test specimen: 60 mm×10 mm×3 mm.

At least 2 measurement per sample.

Figure 2:
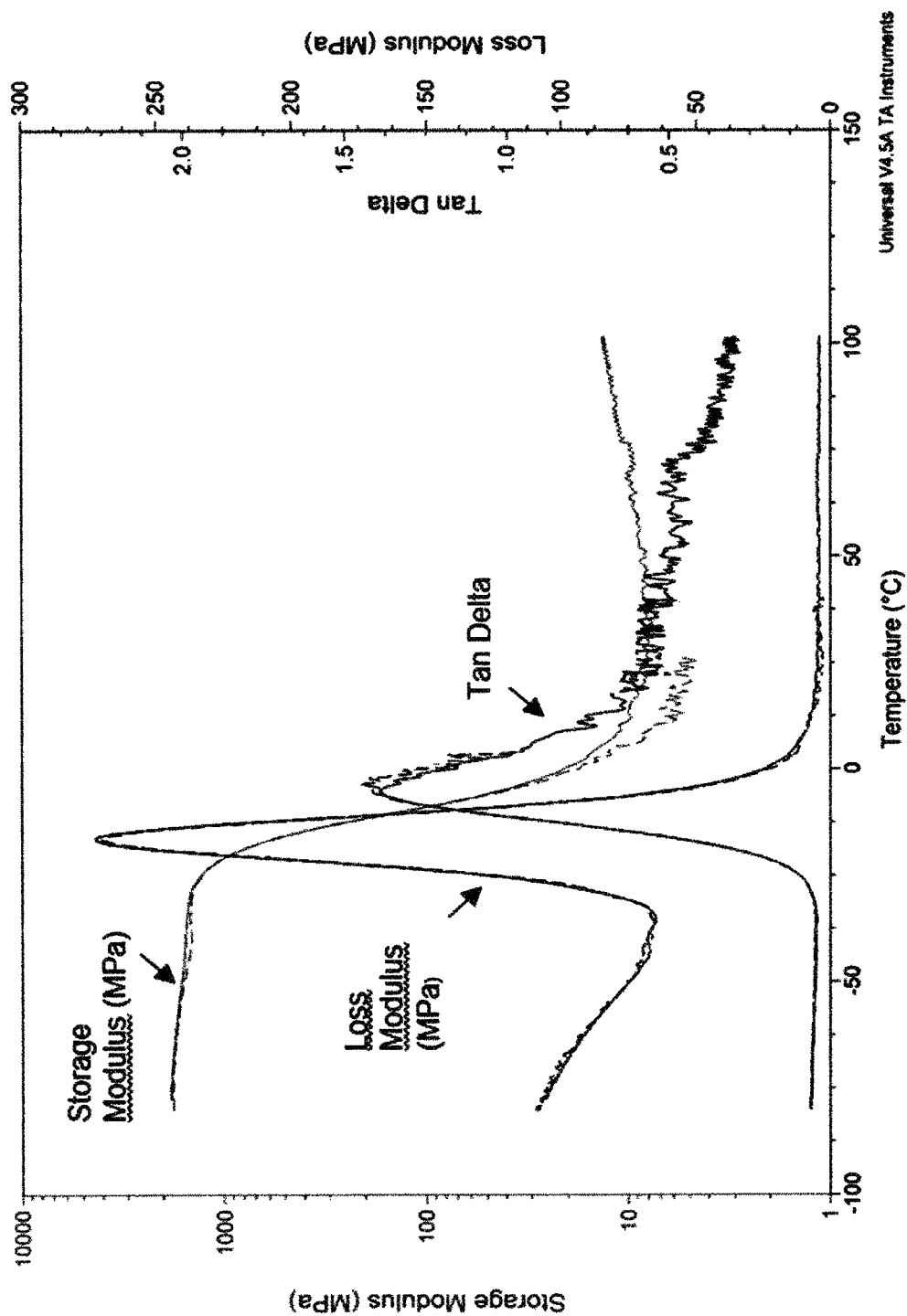
FIG. 2. DMA for composition No. 3, at a frequency of 100 Hz.
Figure 3:
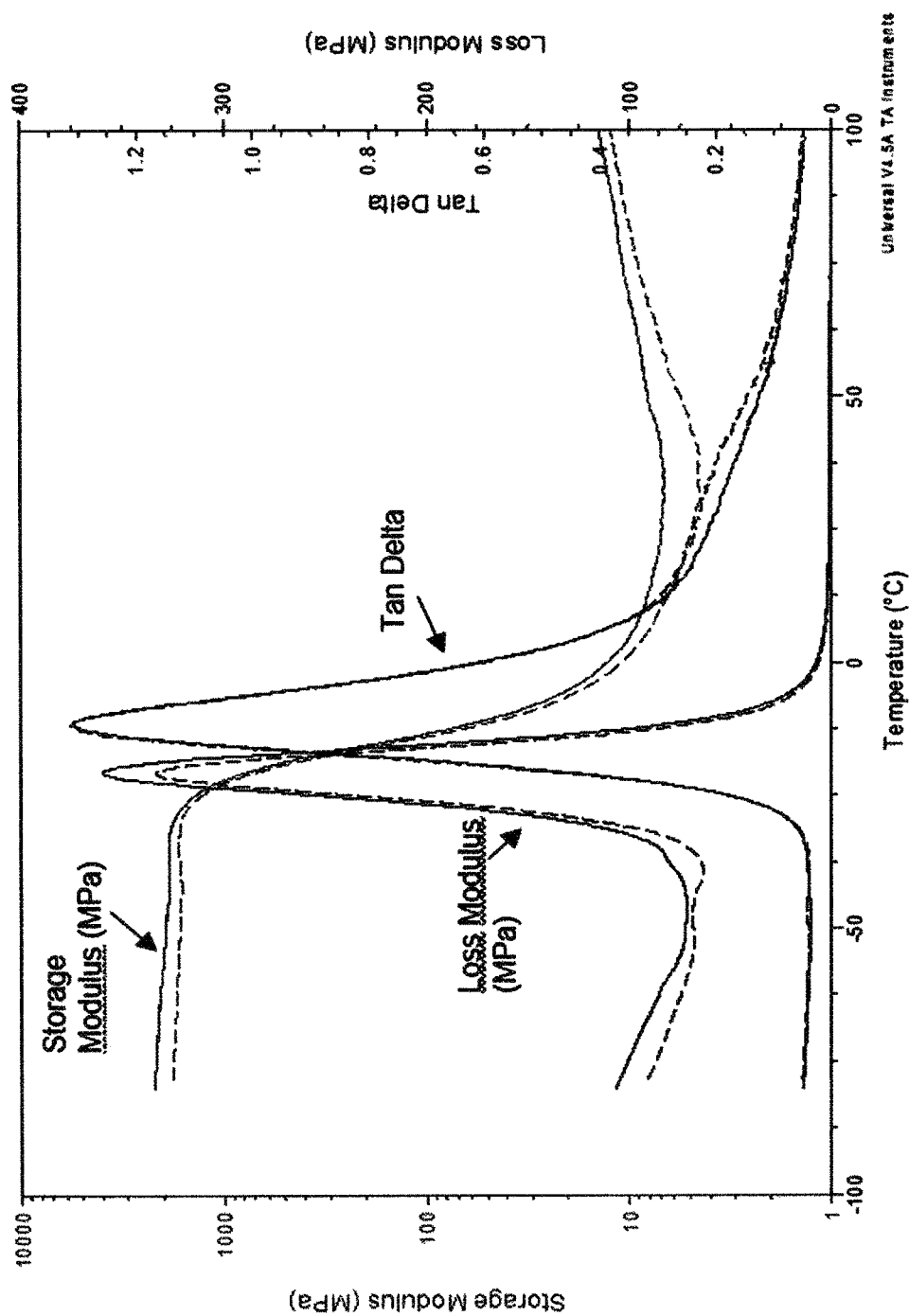
FIG. 3. DMA for composition No. 5, at a frequency of 10 Hz.
Figure 4:
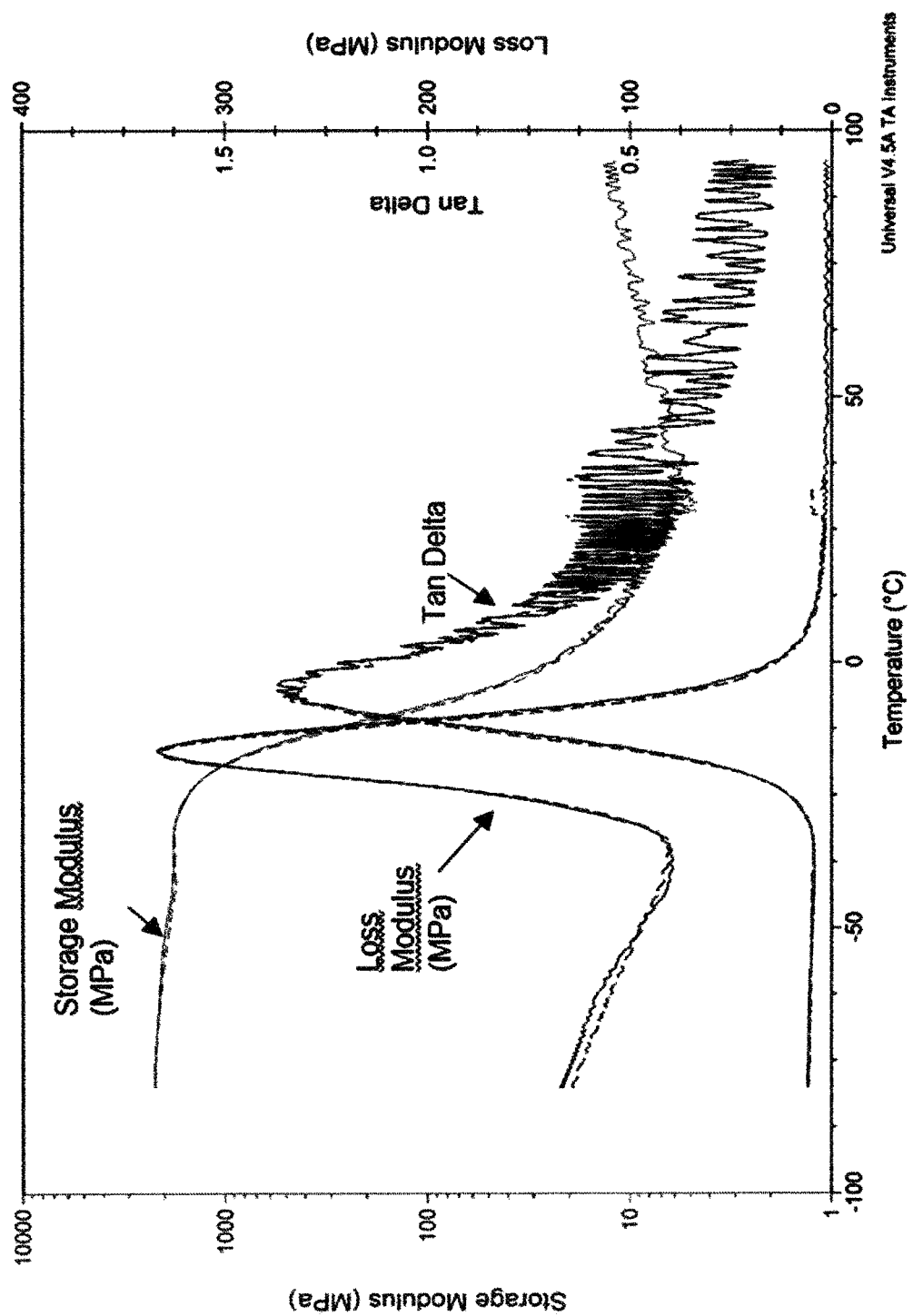
FIG. 4. DMA for composition No. 5, at a frequency of 100 Hz.

The results were shown in FIGS. 1 to 4 and in the following tables.

TABLE 4

Data for the DMA for composition No. 3, at a frequency of 10 Hz.

| | T 50° C. | | T 10° C. | | | | |
|---|---|---|---|---|---|---|---|
| Test | Storage Modulus (MPa) | Loss Modulus (MPa) | Storage Modulus (MPa) | Loss Modulus (MPa) | Tg onset ° C. | Tg Loss ° C. | Tg peak ° C. |
| 1 | 1479 | 61.00 | 5.26 | 1.71 | −22.12 | −19.86 | −10.71 |
| 2 | 1398 | 57.41 | 5.77 | 1.57 | −22.45 | −20.26 | −10.85 |
| Average | 1439 | 59 | 6 | 2 | −22 | −20 | −11 |

TABLE 5

Data for the DMA for composition No. 3, at a frequency of 100 Hz.

| | T 50° C. | | T 10° C. | | | | |
|---|---|---|---|---|---|---|---|
| Test | Storage Modulus (MPa) | Loss Modulus (MPa) | Storage Modulus (MPa) | Loss Modulus (MPa) | Tg onset ° C. | Tg Loss ° C. | Tg peak ° C. |
| 1 | 1620 | 74.79 | 11.08 | 8.05 | −19.74 | −16.46 | −5.16 |
| 2 | 1568 | 75.59 | — | 8.71 | −20.02 | −16.36 | −5.03 |
| Average | 1594 | 75 | — | 8 | −22-20 | −16 | −5 |

TABLE 6

Data for the DMA for composition No. 5, at a frequency of 10 Hz.

| | T 50° C. | | T 10° C. | | | | |
|---|---|---|---|---|---|---|---|
| Test | Storage Modulus (MPa) | Loss Modulus (MPa) | Storage Modulus (MPa) | Loss Modulus (MPa) | Tg onset ° C. | Tg Loss ° C. | Tg peak ° C. |
| 1 | 1948 | 72.50 | 8.51 | 2.71 | −22.12 | −19.86 | −10.71 |
| 2 | 1652 | 68.53 | 7.01 | 2.27 | −22.45 | −20.26 | −10.85 |
| Average | 1800 | 70 | 8 | 2 | −22 | −20 | −11 |

TABLE 7

Data for the DMA for composition No. 5, at a frequency of 100 Hz.

| | T 50° C. | | T 10° C. | | | | |
|---|---|---|---|---|---|---|---|
| Test | Storage Modulus (MPa) | Loss Modulus (MPa) | Storage Modulus (MPa) | Loss Modulus (MPa) | Tg onset ° C. | Tg Loss ° C. | Tg peak ° C. |
| 1 | 1970 | 95.27 | 11.16 | 7.65 | −19.86 | −16.68 | −5.23 |
| 2 | 1888 | 94.04 | 12.63 | 8.68 | −20.21 | −16.99 | −4.80 |
| Average | 1929 | 95 | 12 | 8 | −20 | −17 | −5 |

In this test of DMA the behaviour of the material obtained from compositions 3 and 5 of the invention at frequencies of 10 and 100 Hertz was evaluated. This test simulates the behaviour of the protection of the leading edge against rain impact. It can be seen the lower values of the constants that govern the viscoelastic behaviour of the material in the storage modulus (Storage Modulus) and modulus of losses (Loss modulus) as shown in tables 4 to 7. These lower values make the material behave in a more elastic way and show a better elastic behaviour.

Example 6: LEP Application with Adhesion Promoter in Plant Conditions

The systematic procedure for the right application of the LEP adhesion promoter in plant conditions where the blade is placed in horizontal position is the following:

Surface preparation: sand the previous layer applied to remove the gloss and ensure a good adhesion. Clean the surface with a solvent compatible with the surface, for example isopropyl acetate. Delimit the zone to be protected with tape: Primer zone, transition zone and LEP zone.

Adhesion primer application: clean the surface with a solvent compatible with the surface, for example isopropyl acetate. Apply the primer on the delimited zone with a mixing gun and spread it with a roller. Check the wet film thickness with a standard gauge each meter. The recommended thickness is between 75 to 125 microns. Remove the tapes delimiting the primer zone.

LEP application: wait until the application window starts depending on the environmental conditions. Apply LEP using an appropriate mixing gun and spread it with a filling knife. Check the wet film thickness with a standard gauge each meter. The recommended thickness is between 550 to 650 microns. Remove the tapes delimiting the transition zone. Use a small filling knife to make a transition between the LEP and the tape delimiting the LEP zone. Remove the tape delimiting the LEP zone.

Example 7: Application with Adhesion Promoter in Conditions with Access by Rope or Platform In Situ The systematic procedure for the right application of the LEP adhesion promoter in conditions with access by rope or platform is the following:

Surface preparation: sand all the eroded zone (or previous layer if it has been applied) to remove the gloss and ensure a good adhesion. In the longitudinal direction of the leading edge, sand 50 mm of the old LEP leaving a smooth transition between the old LEP and the repaired zone (transition zone). Soak a paper with a solvent compatible with the surface, for example isopropyl acetate and clean the surface. Delimit the zone to be protected with tape: Primer zone, first LEP layer zone and second LEP layer zone.

Adhesion primer application: clean the surface with a solvent compatible with the surface, for example isopropyl acetate. Apply the primer on the delimited zone with a mixing gun and spread it with a roller. Check the wet film thickness with a standard gauge each meter. The recommended thickness is between 75 to 125 microns. Remove the tapes delimiting the primer zone.

LEP application. First layer: wait until the application window starts depending on the environmental conditions. Apply LEP using an appropriate mixing gun and spread it with a roller. Leave the transition zone without LEP. Check the wet film thickness with a standard gauge each meter. The recommended thickness is between 300 to 350 microns. Level the surface with a brush with longitudinal movements. Remove the tapes delimiting the first LEP layer zone.

LEP application. Second layer: wait until the application window starts depending on the environmental conditions. Apply LEP using an appropriate mixing gun and spread it with a roller. Do not leave the transition zone without LEP. Check the wet film thickness with a standard gauge each meter. The recommended thickness is between 300 to 350 microns. Level the surface with a brush with longitudinal movements. Remove the tapes delimiting the second LEP layer zone. Level the step between the old and new LEP with a brush.

The invention claimed is:

1. A leading edge protection (LEP) having a Shore A hardness of between 30 and 80 in accordance to ISO 868, in the form of a single layer with a thickness between 550 microns and 1,000 microns wherein said leading edge protection consists of cured polyurethane obtained from a composition comprising
    a first component comprising more than 80% by weight of a polycarbonate diol in respect of the total weight of the first component; and
    a second component comprising an aliphatic isocyanate having a molecular weight of from 500-2,000 g/mol selected from the group consisting of isocyanurates, biurets, iminooxadiazinediones, allophanates dimer urediones and mixtures thereof,
    wherein the composition is solvent free and pigmennt-free and
    optionally contains 0.01-0.30 wt % catalysts; 0.30-1.20 wt % antifoaming agent; 0.01 wt %
    deaerating agent 0.10 to 0.60 adherence improving agent and 0.50 to 4.00 wt % thixotropic agent based on the weight of the first component;
    wherein the polycarbonate diol and the aliphatic isocyanate are in the composition in a ratio of about 2:1.

2. The LEP according to claim 1, wherein the LEP exhibits a peeling of between 12 and 18 Mein when tested in accordance to UNE-EN-28510-1 at 90°; and/or wherein the LEP exhibits a pull off of more than 5 MPa in accordance to UNE-ISO-4624; and/or wherein the LEP exhibits a UV ageing below 3 Colour DE when tested in accordance to ASTM D4587-05 for 1000 hours, QUV-B 313 nm and radiation of 0.49±0; 02 W/m<2>(310 nm); and/or wherein the LEP exhibits a water uptake of less than 1% by weight in 10 days at a temperature between 18 and 23° C. or less than 2.5% by weight in 1 day at 90° C.; and/or wherein the LEP exhibits a flexibility of between 20 and 100% elongation at 23° C. and between 5 and 20% elongation at −20° C. when tested in accordance to ASTM D522; and/or wherein the LEP exhibits a roughness of Ra between 1 and 5 and a Rz between 10 and 20; when tested in accordance to ISO 4287-99; and/or wherein the LEP exhibits a gloss of more than of 60 GU and less than 5 GU with a geometry of 60°, in accordance to ISO 2813:2014; and/or wherein the LEP exhibits an abrasion of less than 0.05 Wear for 1000 g with an abrasive wheel CS-1000 during 1000 cycles conditions, in accordance to ASTM D4060; and/or wherein the composition exhibits a traction of E equal to between 2 and 40 MPa, an elongation at break equal to between 50 and 150% and a Tensile Stress break equal to between 0.001 and 40 MPa, in accordance to ISO 527-2.

3. A method for preparing the LEP of claim 1, said method comprising:
   a. mixing a first component comprising more than 80% by weight of a polycarbonate diol in respect of the total weight of the first component; and
   a second component comprising an aliphatic isocyanate having a molecular weight of from 500-2,000 g/mol selected from the group consisting of isocyanurates, biurets, iminooxadiazinediones, allophanates dimer urediones and mixtures thereof,
   wherein the composition is solvent free and pigment-free and
   optionally contains 0.01-0.30 wt % catalysts; 0.30-1.20 wt % antifoaming agent; 0.01 wt % deaerating agent 0.10 to 0.60 adherence improving agent and 0.50 to 4.00 wt % thixotropic agent based on the weight of the first component;
   wherein the ratio of polycarbonate diol to the aliphatic isocyanate in the composition is about 2:1;
   b. coating the lead edge of a wind turbine rotor blade suface with a single layer of the mix of step (a) to a thickness of 550 to 1000 microns; and
   c. curing the coating of step (b) at a temperature between 15° C. and 50° C. between 180 and 30 minutes.

4. A leading edge protection comprising cured polyurethane elastomer formed from a composition consisting of:
   a first component comprising more than 80% by weight of a polycarbonate diol in respect of the total weight of the first component; and
   a second component comprising an aliphatic isocyanate having a molecular weight of from 500-2,000 g/mol selected from the group consisting of isocyanurates, biurets, iminooxadiazinediones, allophanates dimer urediones and mixtures thereof,
   wherein the composition is solvent free and pigment-free and
   optionally contains 0.01-0.30 wt % catalysts; 0.30-1.20 wt % antifoaming agent; 0.01 wt % deaerating agent 0.10 to 0.60 adherence improving agent and 0.50 to 4.00 wt % thixotropic agent based on the weight of the first component;
   wherein the ratio of the polycarbonate diol and to the aliphatic isocyanate in the composition is about 2:1; and
   wherein said cured composition has a hardness of between 20 and 80 Shore A in accordance with ISO868
   wherein said leading edge protection is in the form of a single layer with a thickness between 550 and 700 microns.

5. A leading edge protection comprising cured polyurethane elastomer according to claim 4, in the form of a single layer with a thickness between 550 and 650 microns.

\* \* \* \* \*